(12) United States Patent
Kuroda (10) Patent No.: US 7,751,296 B2
(45) Date of Patent: Jul. 6, 2010

(54) RECORDING MEDIUM, RECORDING APPARATUS AND METHOD, AND REPRODUCING APPARATUS AND METHOD

(75) Inventor: Kazuo Kuroda, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 470 days.

(21) Appl. No.: 11/918,120

(22) PCT Filed: Apr. 13, 2006

(86) PCT No.: PCT/JP2006/307824

§ 371 (c)(1),
(2), (4) Date: Oct. 10, 2007

(87) PCT Pub. No.: WO2006/112350

PCT Pub. Date: Oct. 26, 2006

(65) Prior Publication Data

US 2009/0022041 A1    Jan. 22, 2009

(30) Foreign Application Priority Data

Apr. 13, 2005    (JP)    ............................. 2005-115513

(51) Int. Cl.
G11B 7/00    (2006.01)

(52) U.S. Cl. ...................................... 369/100
(58) Field of Classification Search ................. 369/100, 369/276, 53.1, 53.22, 53.23, 44.26, 44.12, 369/53.11

See application file for complete search history.

(56) References Cited

U.S. PATENT DOCUMENTS

| 5,200,277 | A | 4/1993 | Nakayama et al. |
| 5,343,050 | A | 8/1994 | Egusa et al. |
| 6,373,799 | B1 * | 4/2002 | Ono et al. ................. 369/52.1 |

FOREIGN PATENT DOCUMENTS

| JP | 63-63143 A | 3/1988 |
| JP | 1-221806 A | 9/1989 |
| JP | 6-36877 A | 2/1994 |
| JP | 3087063 U | 7/2002 |
| JP | 2004-296031 A | 10/2004 |
| JP | 2005-166254 A | 6/2005 |

* cited by examiner

*Primary Examiner*—Nabil Z Hindi
(74) *Attorney, Agent, or Firm*—Young & Thompson

(57) ABSTRACT

A recording medium (100) is provided with: an element layer including a semiconductor element (110) and an emission element (130), which emits light on the basis of an instruction from the semiconductor element; and a recording layer (120) in which readable predetermined data is recorded by irradiating a light beam.

24 Claims, 8 Drawing Sheets

RECORDING MEDIUM, RECORDING APPARATUS AND METHOD, AND REPRODUCING APPARATUS AND METHOD

TECHNICAL FIELD

The present invention relates to a recording medium, such as a DVD, a recording apparatus and method, such as a DVD recorder, and a reproducing apparatus and method, such as a DVD player.

BACKGROUND ART

Nowadays, various recording media for recording movies, music, data for PC, or the like are developed and commercialized. The flow of the development and commercialization starts from a CD-ROM (Compact Disc-Read Only Memory), a CD-R (Compact Disc-Recordable), or the like with a recording capacity of about 650 MB, and then is followed by a DVD-ROM, a DVD-R/RW, or the like with a recording capacity of about 4.7 GB, and further followed by a dual-layer type DVD-ROM, DVD-R, or the like with a recording capacity of about 8.5 GB. Lately, as the next generation disc of the DVD, a Blu-ray Disc with a recording capacity of about 27 GB has been developed. That is, the development and commercialization of such recording media have been promoted by each manufacturer, substantially from one viewpoint of an increase in the recording capacity.

Incidentally, there is no document having the content that is directly related to the construction of the present invention discussed below at the filing time point of the present invention.

DISCLOSURE OF INVENTION

Subject to be Solved by the Invention

However, in the field of such recording media, the limit of the increase in the recording capacity is seen coming. That is, the increase in the recording capacity is considered to have a technical limiting point due to parts which are used for a recording apparatus and a reproducing apparatus, their specification, and the like. Here, it is being tried to give an added value to the recording media, which are now facing the limit in the recording capacity, by incorporating a semiconductor circuit on the recording medium. However, since the semiconductor circuit is formed generally at high temperature, there is such a technical problem that it cannot be preferably incorporated in the recording media including plastic resin or the like.

In view of the aforementioned conventional problems, it is therefore an object of the present invention to provide a recording medium having a semiconductor circuit which can be relatively easily incorporated, a recording apparatus for and method of performing a recording operation on such a recording medium, and a reproducing apparatus for and method of performing a reproduction operation on such a recording medium.

Means for Solving the Subject (Recording Medium)

The above object of the present invention can be achieved by a recording medium provided with: an element layer provided with a semiconductor element and an emission element, which emits light on the basis of an instruction from the semiconductor element; and a recording layer in which readable predetermined data is recorded by irradiating a light beam.

According to the recording medium of the present invention, it is possible to record readable various data, such as movies, music, and data for PC, by irradiating the light beam, such as laser light, into the recording layer including an organic dye film or a phase change film, as in e.g. a DVD and a CD.

In the present invention, in particular, in addition to the recording layer, the element layer provided with the semiconductor element and the emission element is also provided. The semiconductor element is formed on various substrates, such as a plastic substrate, under a relatively low-temperature environment. On the semiconductor element, there may be formed a memory circuit for storing the data, or a processing circuit for processing the data, or the like. The data stored in the memory circuit is not necessarily the same as the data recorded in the recording layer. It may be data which is related to or not related at all to the data recorded in the recording layer. The emission element emits light. By emitting the light from the emission element, an optical communication (e.g. VLC: Visible Light Communication) is performed with an apparatus in the exterior of the recording medium, to thereby exchange the data. The emission operation by the emission element is controlled, for example, by a circuit formed in the semiconductor element. For example, by emitting the light, the data stored in the memory circuit, which is formed in the semiconductor element, may be transmitted (or outputted) to the exterior. Alternatively, by emitting the light, an instruction from the processing circuit may be transmitted (or outputted) to the exterior, to thereby control the external equipment.

As described above, by forming the semiconductor element and the emission element on the recording medium in addition to the recording layer in which the data is recorded by irradiating the light beam provided for a DVD, a CD, and a MO, it is possible to add an additional function to the recording medium in addition to the normal function of recording the data. In particular, the semiconductor element is formed on various substrates, such as a plastic substrate, under a relatively low-temperature environment. That is, it is not necessary to form it under a high-temperature environment like a general silicon semiconductor, so that there is such a great advantage that the semiconductor element can be relatively easily incorporated to the recording medium provided with the recording layer.

In one aspect of the recording medium of the present invention, the semiconductor element is formed by at least one of a deposition method and a coating method.

According to this aspect, it is possible to form the semiconductor element on the plastic substrate by using the deposition method and/or the coating method (e.g. an ink jet method or the like), which are performed under a relatively low-temperature environment.

In another aspect of the recording medium of the present invention, the semiconductor element includes an organic semiconductor.

According to this aspect, the semiconductor element includes the organic semiconductor, which can be formed under a relatively low-temperature environment. Therefore, with respect to the recording medium having the normal recording layer, its substrate or the like does not have to be exposed under a high-temperature environment, so that it is possible to form the semiconductor element, relatively easily and preferably.

In another aspect of the recording medium of the present invention, the semiconductor element stores therein data which is related to the data recorded in the recording layer.

According to this aspect, it is possible to select the data which is stored into the semiconductor element (more specifically, a semiconductor memory (or memory circuit) formed in the semiconductor element), in response to the content or the like of the data recorded in the recording layer. For example, file system information which is related to the data recorded in the recording layer may be stored in the semiconductor element. Alternatively, if the data recorded in the recording layer is a game or the like, data which indicates the game is played to what extent (i.e. so-called save data) may be stored in the semiconductor element.

In another aspect of the recording medium of the present invention, the recording medium has a circular disk shape, and the emission element is formed in a ring shape.

According to this aspect, even if the recording medium is rotated, the light is emitted from the ring-shaped emission element in accordance with the rotation of the recording medium, to thereby preferably exchange the data with the exterior of the recording medium. Thus, when the light is emitted from the emission element, the recording medium does not necessarily stop, so that there is an advantage of further improvement of convenience of the recording medium.

In another aspect of the recording medium of the present invention, the emission element is formed throughout an entire surface of the recording medium.

According to this aspect, it is possible to display predetermined characters and predetermined drawing patterns by emitting the light from the emission element, which is placed throughout substantially the entire surface of the recording medium (e.g. substantially the entire surface on one side of the recording medium).

In another aspect of the recording medium of the present invention, an emission pattern of the emission element is a barcode pattern.

According to this aspect, it is possible to include various data in the barcode pattern to thereby exchange more data.

In another aspect of the recording medium of the present invention, the emission element includes an organic EL (Electro Luminescence) element.

According to this aspect, the emission element includes the organic EL element, which can be formed under a relatively low-temperature environment. Therefore, with respect to the recording medium having the normal recording layer, its substrate or the like does not have to be exposed under a high-temperature environment, so that it is possible to form the emission element, relatively easily and preferably. Moreover, if the semiconductor element includes the organic semiconductor, it is possible to improve an affinity between the emission element and the semiconductor element.

In another aspect of the recording medium of the present invention, the emission element includes an inorganic EL element.

According to this aspect, the emission element includes the inorganic EL element which can be formed under a relatively low-temperature environment. Therefore, with respect to the recording medium having the normal recording layer, its substrate or the like does not have to be exposed under a high-temperature environment, so that it is possible to form the emission element, relatively easily and preferably.

In another aspect of the recording medium of the present invention, the emission element is formed in a position closer to an exterior of the recording medium, compared to the semiconductor element.

According to this aspect, the light that is emitted from the emission element more easily reaches a light receiving element which is in the exterior of the recording medium. Therefore, it is possible to increase the efficiency of the data exchange with the exterior of the recording medium by using the emission element.

In another aspect of the recording medium of the present invention, the element layer is further provided with a light receiving element for receiving light which enters from an exterior of the recording medium.

According to this aspect, it is possible to receive the data transmitted from the exterior of the recording medium, not only by transmitting the data to the exterior of the recording medium by using the emission element, but also by receiving the light that is irradiated from the exterior of the recording medium on the light receiving element. That is, it is possible to realize a two-way communication between the recording medium and the exterior of the recording medium, to thereby improve the convenience of the recording medium.

In an aspect of the recording medium provided with the light receiving element, as described above, the recording medium may have a circular disk shape, and the light receiving element may be formed in a ring shape.

According to this aspect, even if the recording medium is rotated, the light receiving element can receive the light stably. That is, when the light receiving element receives the light, the recording medium does not necessarily stop, so that there is an advantage of further improvement of convenience of the recording medium.

In an aspect of the recording medium provided with the light receiving element, as described above, the light receiving element may include an organic light receiving element.

By virtue of such construction, the light receiving element includes the organic light receiving element (e.g. an organic solar battery element or the like) which can be formed under a relatively low-temperature environment. Therefore, with respect to the recording medium having the normal recording layer, its substrate or the like does not have to be exposed under a high-temperature environment, so that it is possible to form the light receiving element, relatively easily and preferably. Moreover, if the semiconductor element includes the organic semiconductor, or if the emission element includes the organic EL element, it is possible to improve an affinity between the emission element or the semiconductor element and the light receiving element.

In an aspect of the recording medium provided with the light receiving element, as described above, the light receiving element is formed in a position closer to an exterior of the recording medium, compared to the semiconductor element.

By virtue of such construction, the light that is emitted from an emission element in the exterior of the recording medium more easily reaches the light receiving element. Therefore, it is possible to increase the efficiency of the data exchange with the exterior of the recording medium by using the emission element.

In another aspect of the recording medium of the present invention, the element layer is further provided with a feed element for feeding an electric power to at least one of the semiconductor element and the emission element.

According to this aspect, it is possible to preferably feed the electric power, which is necessary for the semiconductor element to operate or which is necessary for the emission element to emit the light, from the feed element. The feed element may include a metal electrode or the like to be supplied with the electric power from the exterior. Alternatively, the feed element may include various batteries or the like, such as a solar battery, as described later.

In an aspect of the recording medium provided with the feed element, as described above, the feed element includes an organic solar battery.

By virtue of such construction, the feed element includes the organic solar battery which can be formed under a relatively low-temperature environment. Therefore, with respect to the recording medium having the normal recording layer, its substrate or the like does not have to be exposed under a high-temperature environment, so that it is possible to form the feed element, relatively easily and preferably. Moreover, if the semiconductor element includes the organic semiconductor, or if the emission element includes the organic EL element, it is possible to improve an affinity between the emission element or the semiconductor element and the feed element. Moreover, the electric power can be fed as long as the recording medium is irradiated with the light, so that the operations of the semiconductor element and the emission element can be continued semipermanently. Moreover, if the feed element includes the organic solar battery, there are such advantages that the feed element fulfills a function of feeding the electric power and that the feed element fulfills a function as the aforementioned light receiving element.

In an aspect of the recording medium provided with the feed element including the organic solar battery, as described above, the organic solar battery may be formed in a position closer to an exterior of the recording medium, compared to the semiconductor element.

By virtue of such construction, the light which enters from the exterior of the recording medium easily reaches the organic solar battery, to thereby increase power generation efficiency. Therefore, it is possible to increase the efficiency of the electric power fed by the feed element.

In an aspect of the recording medium provided with the light receiving element, as described above, it may be further provided with an electrical double capacitor layer in which an electric power which is photoelectrically converted by the light receiving element.

By virtue of such construction, it is possible to operate the emission element, the light receiving element, and the semiconductor element, by using the electric power accumulated in the electrical double capacitor layer. In particular, even if it is in the circumstance that the electric power is not fed from the feed element, it is possible to operate the emission element, the light receiving element, and the semiconductor element, by using the electric power accumulated in the electrical double capacitor layer.

(Recording Apparatus)

The above object of the present invention can be also achieved by a recording apparatus for recording data onto a recording medium provided with: an element layer provided with a semiconductor element and an emission element, which emits light on the basis of an instruction from the semiconductor element; and a recording layer in which the readable predetermined data is recorded by irradiating a light beam, the recording apparatus provided with: a recording device for recording the data into the recording layer by irradiating the light beam; and a light receiving device for receiving the light emitted by the emission element.

According to the recording apparatus of the present invention, the data can be recorded into the recording layer by irradiating the recording layer of the recording medium with the light beam by virtue of the operation of the recording device. Moreover, by receiving the light that is emitted from the emission element of the recording medium by virtue of the operation of the light receiving device, it is possible to receive the data by performing the optical communication with the recording medium (more specifically, with the semiconductor element of the recording medium).

Incidentally, in response to various aspects of the recording medium of the present invention described above, the recording apparatus of the present invention can employ various aspects.

In one aspect of the recording apparatus of the present invention, the element layer is further provided with a light receiving element for receiving light which enters from an exterior of the recording medium, and the recording apparatus is further provided with an emitting device for emitting light to the light receiving element.

According to this aspect, it is possible to transmit the data to the recording medium not only by receiving the data from the recording medium by using the light receiving device but also by emitting the light to the recording medium by using the emitting device. That is, it is possible to realize a two-way communication between the recording apparatus and the recording medium, to thereby improve the convenience of the recording apparatus.

(Recording Method)

The above object of the present invention can be also achieved by a recording method of recording data onto a recording medium provided with: an element layer provided with a semiconductor element and an emission element, which emits light on the basis of an instruction from the semiconductor element; and a recording layer in which the readable predetermined data is recorded by irradiating a light beam, the recording method provided with: a recording process of recording the data into the recording layer by irradiating the light beam; and a light receiving process of receiving the light emitted by the emission element.

According to the recording method of the present invention, it is possible to receive the same various benefits as those of the recording apparatus of the present invention described above.

Incidentally, in response to various aspects of the recording medium or the recording apparatus of the present invention described above, the recording method of the present invention can employ various aspects.

(Reproducing Apparatus)

The above object of the present invention can be also achieved by a reproducing apparatus for reproducing data recorded on a recording medium provided with: an element layer provided with a semiconductor element and an emission element, which emits light on the basis of an instruction from the semiconductor element; and a recording layer in which the readable predetermined data is recorded by irradiating a light beam, the reproducing apparatus provided with: a reproducing device for reproducing the data recorded in the recording layer by irradiating the light beam; and a light receiving device for receiving the light emitted by the emission element.

According to the reproducing apparatus of the present invention, the data recorded in the recording layer can be reproduced by irradiating the recording layer of the recording medium with the light beam by virtue of the operation of the reproducing device. Moreover, by receiving the light that is emitted from the emission element of the recording medium by virtue of the operation of the light receiving device, it is possible to exchange the data by performing the optical communication with the recording medium (more specifically, with the semiconductor layer of the recording medium).

Incidentally, in response to various aspects of the recording medium of the present invention described above, the reproducing apparatus of the present invention can employ various aspects.

In one aspect of the reproducing apparatus of the present invention, the element layer is further provided with a light receiving element for receiving light which enters from an exterior of the recording medium, and the reproducing apparatus is further provided with an emitting device for emitting light to the light receiving element.

According to this aspect, it is possible to transmit the data to the recording medium not only by receiving the data from the recording medium by using the light receiving device but also by emitting the light to the recording medium by using the emitting device. That is, it is possible to realize a two-way communication between the reproducing apparatus and the recording medium, to thereby improve the convenience of the reproducing apparatus.

(Reproducing Method)

The above object of the present invention can be also achieved by a reproducing method of reproducing data recorded on a recording medium provided with: an element layer provided with a semiconductor element and an emission element, which emits light on the basis of an instruction from the semiconductor element; and a recording layer in which the readable predetermined data is recorded by irradiating a light beam, the reproducing method provided with: a reproducing process of reproducing the data recorded in the recording layer by irradiating the light beam; and a light receiving process of receiving the light emitted by the emission element.

According to the reproducing method of the present invention, it is possible to receive the same various benefits as those of the reproducing apparatus of the present invention described above.

Incidentally, in response to various aspects of the recording medium or the reproducing apparatus of the present invention described above, the reproducing method of the present invention can employ various aspects.

These effects and other advantages of the present invention will become more apparent from the following embodiments.

As explained above, the recording medium of the present invention is provided with: the element layer provided with the semiconductor element and the emission element; and the recording layer. Therefore, it is possible to add an additional function to the recording medium and it is also possible to incorporate the additional function (specifically, a semiconductor layer or the like), relatively easily. Moreover, the recording apparatus of the present invention is provided with the recording device and the light receiving device. The recording method of the present invention is provided with the recording process and the light receiving process. Therefore, it is possible to record the data onto the recording medium of the present invention, and it is also possible to perform the communication by receiving the light that is emitted from the emission layer. Moreover, the reproducing apparatus of the present invention is provided with the reproducing device and the light receiving device. The reproducing method of the present invention is provided with the reproducing process and the light receiving process. Therefore, it is possible to reproduce the data recorded on the recording medium of the present invention, and it is also possible to perform the communication by receiving the light that is emitted from the emission layer.

DESCRIPTION OF REFERENCE CODES 100 optical disc
110 semiconductor layer
120 light-receiving layer
130 emission layer
140 recording layer
151, 152 feed terminal
200 information recording/reproducing apparatus
352 optical pickup
361 LD
362 PD

BEST MODE FOR CARRYING OUT THE INVENTION

Hereinafter, the best mode for carrying out the present invention will be discussed in order for each embodiment, with reference to the drawings.

(Structure of Optical Disc)

Figure 1:
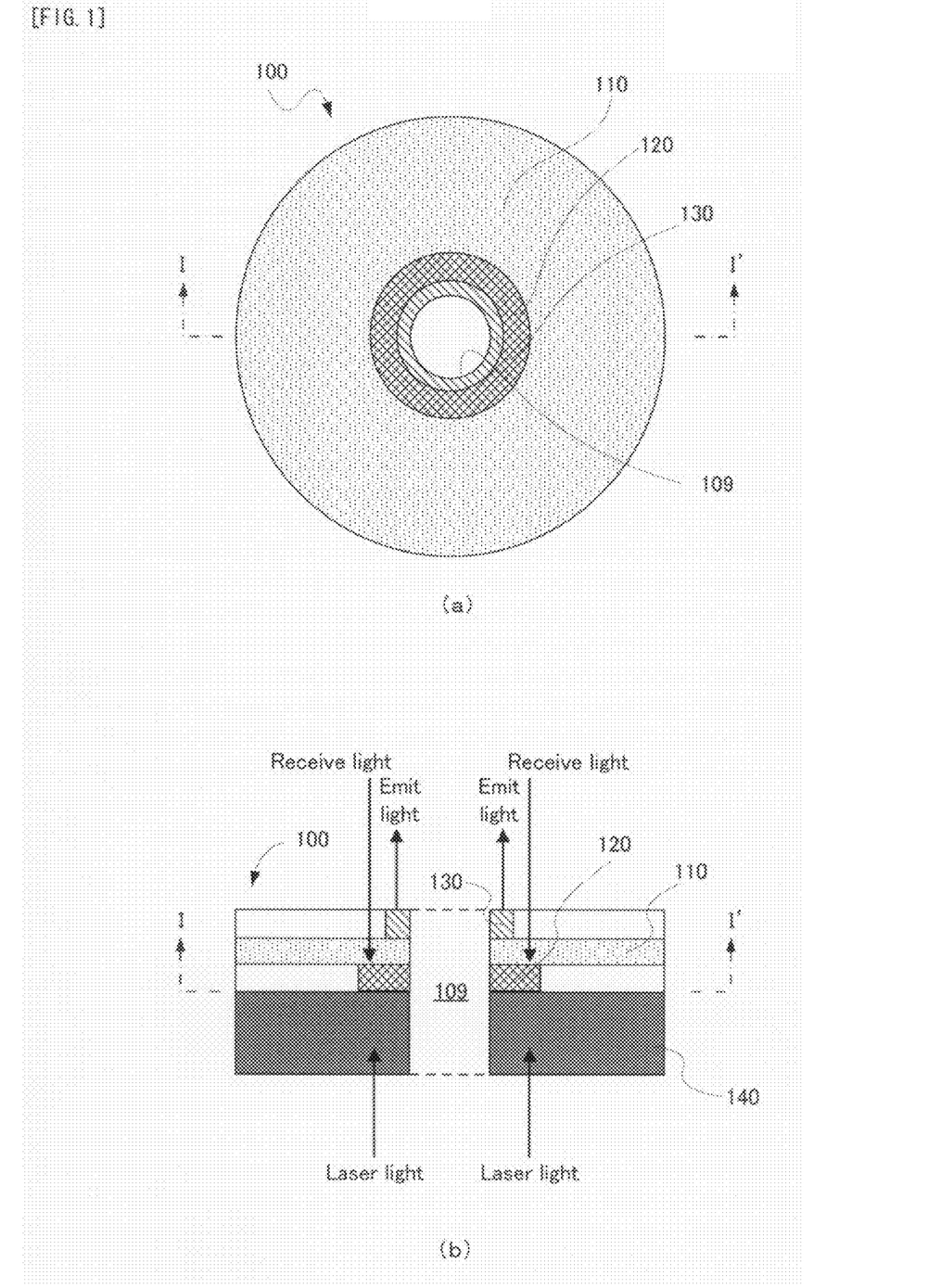
FIG. 1 is a plan view and a cross sectional view showing an outline structure of an optical disc in an embodiment.

Firstly, the structure of an optical disc 100 as a recording medium in an embodiment will be explained by using FIG. 1. FIG. 1 is a plan view and a cross sectional view showing an outline structure of the optical disc in the embodiment.

As shown in FIG. 1($a$), the optical disc 100 is a circular disk shape with a diameter of about 12 cm, and it is provided with a center hole 109 in the center. Moreover, as shown in FIG. 1($a$), on one side surface of the optical disc 100, there is formed a recording layer 140 (refer to FIG. 1($b$)) including an organic dye film or a phase change film. On the other hand, on the other side surface, there are formed a semiconductor layer 110, a light-receiving layer 120, and an emission layer 130, which are distributed concentrically. In other words, the semiconductor layer 110, the light-receiving layer 120, the emission layer 130, and the recording layer 140 are laminated or stacked, to thereby constitute the optical disc 100. Moreover, the surrounding portion or the gap portion of the semiconductor layer 110, the light-receiving layer 120, the emission layer 130, and the recording layer 140 is protected by a plastic substrate or the like. As examples of the recording layer 140 of the optical disc 100, there are listed the same recording layers as those of a DVD-ROM, a DVD±R, a DVD±RW, a DVD-RAM, a BD (Blu-ray Disc), a HD DVD (High Definition DVD), a MO (Magnet-Optical disk), or the like.

Such an optical disc 100 may be manufactured by forming the recording layer 140 separately from the semiconductor layer 110, the light-receiving layer 120, and the emission layer 130, and then bonding them. Alternatively, it may be manufactured so that the semiconductor layer 110, the light-receiving layer 120, the emission layer 130, and the recording layer 140 are laminated in order.

The semiconductor layer 110 is a layer in which a semiconductor circuit is formed including an organic semiconductor. The organic semiconductor is formed under a low-temperature environment, relatively easily, by a deposition method, a coating method (e.g. ink jet method), or the like. As the semiconductor circuit, a processing circuit for performing signal processing, a memory circuit for storing data, or the like are listed as one specific example.

The light-receiving layer 120 receives the light that is irradiated from the exterior of the optical disc 100. At this time, the light irradiated from the exterior is used for optical communication (e.g. VLC: Visible Light Communication), which repeats blinking in accordance with a predetermined rule. More specifically, the light receiving layer 120 receives the light that is intentionally irradiated from external equipment, to thereby perform the optical communication with the external equipment (in particular, to receive data which is transmitted from the external equipment), under the control of the semiconductor circuit included in the semiconductor layer 110. The light receiving layer 120 includes, for example, an organic solar battery. If the light-receiving element 120 includes the organic solar battery, it can perform the optical communication by receiving the light that is intentionally irradiated from the exterior, and it can also feed an electric power to the semiconductor layer 110 and the emission layer 130 (furthermore, the light-receiving layer 120 itself) by receiving the light that is intentionally or fortuitously irradiated from the exterior. In order to feed the electric power, the light-receiving layer 120 is electrically connected to each of the semiconductor layer 110 and the emission layer 130.

The emission layer 130 emits light to the exterior of the optical disc 100. More specifically, the emission layer 130 intentionally emits the light to the external equipment, to thereby perform the optical communication with the external equipment (in particular, to transmit data to the external equipment), under the control of the semiconductor circuit (in particular, a processing circuit) included in the semiconductor layer 110. The emission layer 130 includes, for example, an organic EL element or an inorganic EL element.

The recording layer 140 includes an organic dye film or a phase change film, as in the recording layer of a normal CD and DVD. By irradiating the recording layer with laser light, recording pits are formed. As a result, various data, such as video data, audio data, and data for PC, are recorded. Alternatively, embossed pits or the like may be formed in advance in the recording layer 140.

The data storage and the optical communication using the semiconductor layer 110 and the like will be explained, more specifically. The semiconductor circuit (in particular, a memory circuit) of the semiconductor layer 110 may store therein the data related to the various data which are recorded into the recording layer 140 (or the data linked to the various data which are recorded into the recording layer 140). For example, if the data is recorded into the recording layer 140, data which indicates the characteristics of the relevant data or the like (specifically, e.g. a file system) may be stored into the semiconductor circuit. Alternatively, if a data file, such as a game, is recorded in advance in the recording layer 140, save data which indicates how a user plays in the game may be stored in the semiconductor circuit. Of course, the data that is not related to the data which are recorded into the recording layer 140 may be recorded in the semiconductor layer 110.

As described above, by providing the optical disc 100 with the semiconductor layer 110 including the organic semiconductor, the light-receiving layer 120 including the organic solar battery, and the emission layer 130 including the organic EL element, it is possible to receive various benefits explained below.

Firstly, since the semiconductor circuit can be formed of the organic semiconductor, it is possible to manufacture the optical disc 100 which is provided with the semiconductor layer 110, under the low-temperature environment, relatively easily, by using a deposition method and a coating method. That is, in case of the semiconductor layer including a silicon semiconductor like a conventional semiconductor circuit, the semiconductor layer needs to be formed under a high-temperature environment; however, it is difficult to form the semiconductor layer including the silicon semiconductor on the recording layer 140 under the high-temperature environment. According to the embodiment, however, it is possible to form the semiconductor layer 110 including the organic semiconductor on the recording layer 140 under the low-temperature environment. That is, in terms of easy manufacturing, the optical disc 100 in the embodiment has one great advantage.

In addition, it is also possible to give a new added value to the optical disc which normally merely records (or deletes) or reproduces the data by simply irradiating the laser light. That is, the data can be recorded onto the recording layer 140, and the data recorded in the recording layer 140 can be reproduced. At the same time, the optical communication can be preferably performed with the external equipment, by the operations of the light-receiving layer 120 and the emission layer 130, which operate under the control of the semiconductor circuit of the semiconductor layer 110. Specifically, because of an instruction of the external equipment or the semiconductor circuit of the semiconductor layer 110, it is possible to store the data into the semiconductor circuit of the semiconductor layer 110, or to read the data stored in the semiconductor circuit of the semiconductor layer 110. Alternatively, because of an instruction of the external equipment or the semiconductor circuit of the semiconductor layer 110, it is possible to give an instruction to perform a predetermined process on the semiconductor circuit of the semiconductor layer 110, or to give an instruction to perform a process on the external equipment. In summary, in terms of a diverse function, the optical disc 100 in the embodiment has another great advantage.

Moreover, the organic semiconductor can be manufactured by using a coating method (specifically, e.g. an ink jet method) which is excellent in cost performance. Thus, there is such an advantage that the optical disc 100 can be manufactured inexpensively while an added value is given thereto.

Moreover, the optical disc 100 in FIG. 1 has the light receiving layer 120 and the emission layer 130, which are formed concentrically (i.e. in a ring shape). Therefore, even if the optical disc 100 is rotated at high speed centered on the center hole 109 by the operation of a spindle motor described later, there is no change in a light-receiving area in the light receiving layer 120 and an emission area in the emission layer 130. Therefore, even if the optical disc 100 is rotated or stops, or in any cases, it is possible to preferably perform the optical communication with the external equipment without any special problem, by the operations of the light-receiving layer 120 and the emission layer 130, which are controlled by the semiconductor circuit of the semiconductor layer 110.

In addition, if file system information is recorded in the semiconductor circuit of the semiconductor layer 110, it is possible to preferably read the file system information without performing an initial operation, which includes an adjustment process or the like for adjusting the laser light for reading the data recorded in the recording layer 140. This is a great advantage from the viewpoint of the stress-less recording operation or reproduction operation.

Moreover, if the save data is stored in the semiconductor circuit of the semiconductor layer 110, external memory equipment (e.g. a memory card or the like) for recording the save data is not necessary. Therefore, one optical disc allows the operations regarding the optical disc to be performed. Thus, it helps improvement of convenience for a user.

Figure 2:
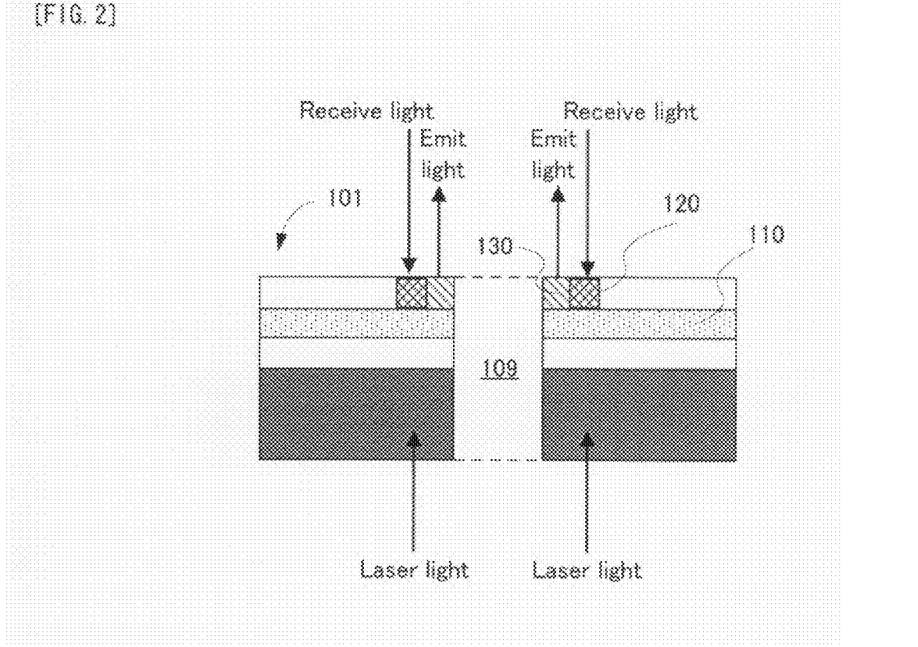
FIG. 2 is a cross sectional view showing another outline structure of the optical disc in the embodiment.

Incidentally, the aspect of the lamination of the semiconductor layer 110, the light-receiving layer 120, and the emission layer 130 is not limited to the aspect shown in FIG. 1(b), and it may be an aspect of the lamination shown in FIG. 2. FIG. 2 is a cross sectional view showing an outline structure of an optical disc 101 which has an aspect of the lamination different from that of the optical disc 100.

As shown in FIG. 2, on the optical disc 101, each of the light-receiving layer 120 and the emission layer 130 is formed on the upper side of the semiconductor layer 110 (i.e. on the closer side to the outer portion of the optical disc 101). This is because the light-receiving layer 120 receives the light that is irradiated from the external equipment, so that it is preferable not to provide any extra space or constituent element between the light-receiving layer 120 and the external equipment, in order to receive the irradiated light more efficiently. Moreover, because the emission layer 130 emits the light to the external equipment, it is preferable not to provide any extra space or constituent element between the emission layer 130 and the external equipment, in order to efficiently propagate the emitted light to the external equipment. Thus, by employing the configuration shown in FIG. 2, the efficiency in the optical communication can be improved.

Of course, another aspect in the lamination may be employed. The point is that it is possible to receive the aforementioned various benefits as long as the semiconductor layer 110, the light-receiving layer 120, and the emission layer 130 are formed. However, from the viewpoint of improving the efficiency in the optical communication, as shown in FIG. 2, each or either one of the light-receiving layer 120 and the emission layer 130 is preferably formed on the closer or closest side to the exterior of the optical disc 101.

(Aspects of Emission)

Next, with reference to FIG. 3 to FIG. 5, the aspects of the emission in the emission layer 130 will be explained more specifically. Each of FIG. 3 to FIG. 5 is a plan view conceptually showing an aspect of the emission in the emission layer 130.

Figure 3:
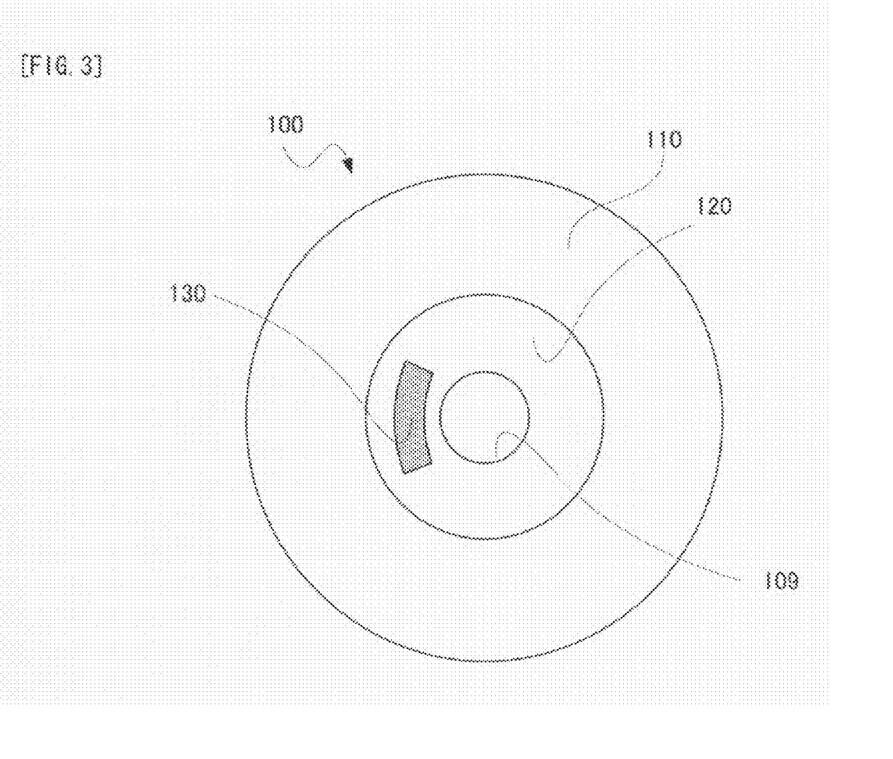
FIG. 3 is a plan view conceptually showing one aspect of emission in an emission layer.

As shown in FIG. 3, the emission layer 130 may have such a shape that it is distributed in one portion on the circumference. In this case, the external equipment receives the light that is emitted from the emission layer 130, to thereby detect the number of rotations of the optical disc 100.

Figure 4:
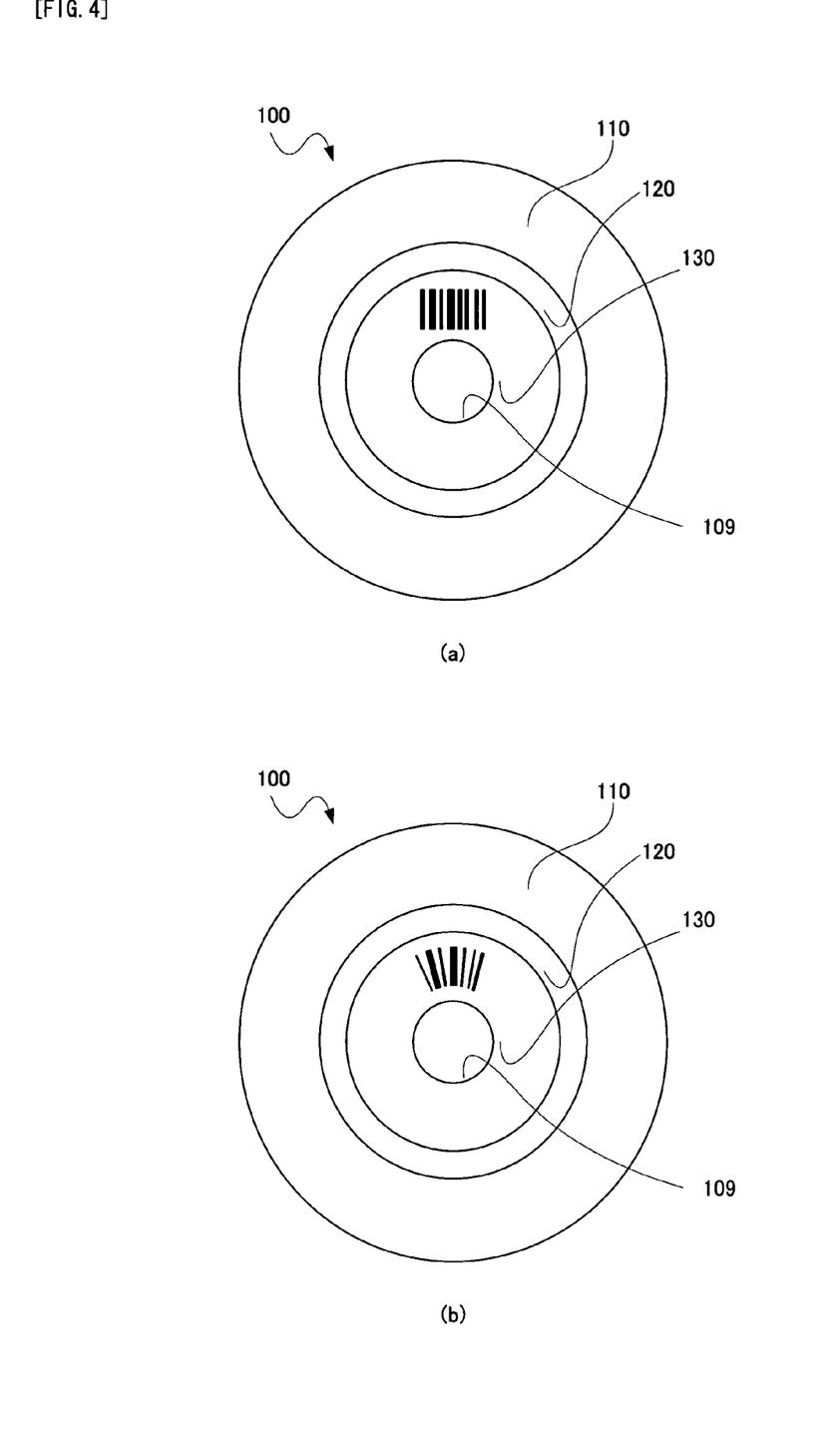
FIGS. 4 are plan views conceptually showing another aspect of the emission in the emission layer.
Figure 5:
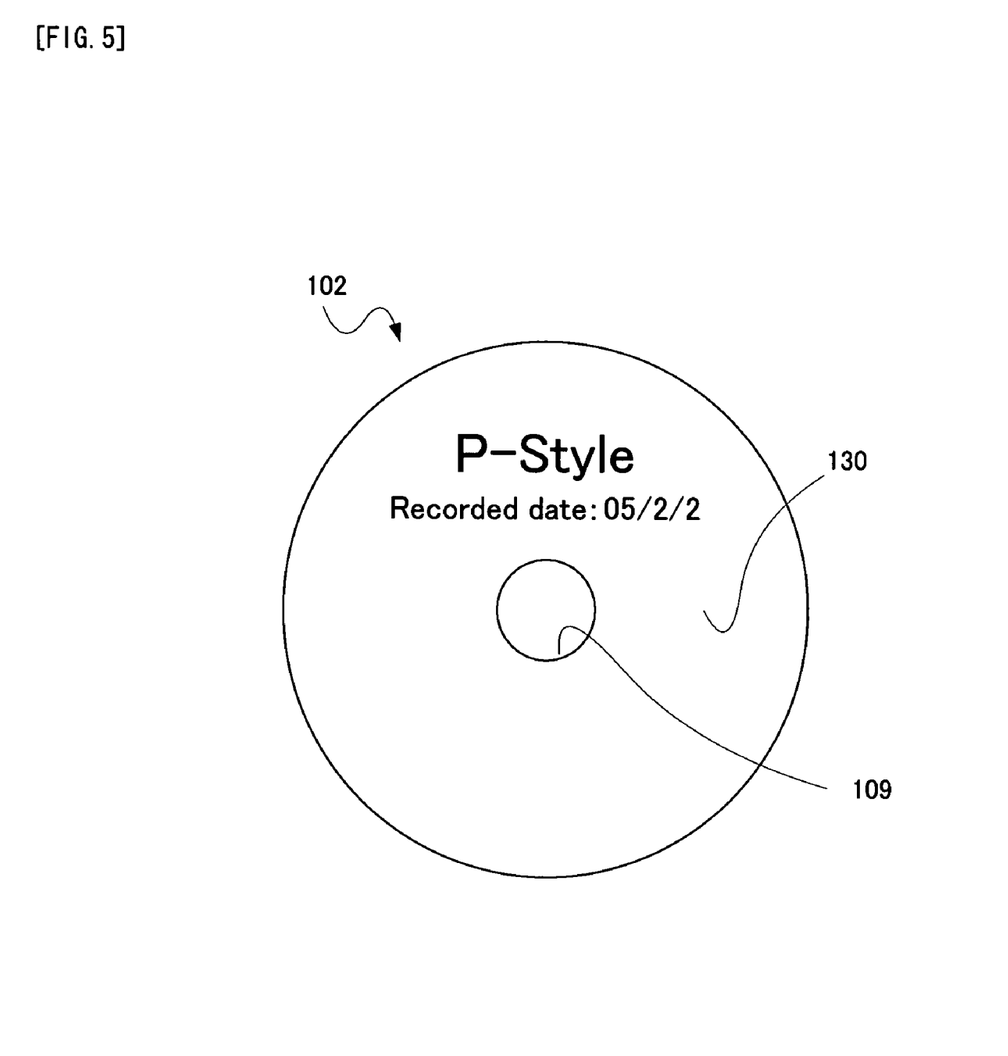
FIG. 5 is a plan view conceptually showing another aspect of the emission in the emission layer.

As shown in FIG. 4(a), the emission layer 130 may emit the light such that the shape of a barcode pattern emerges. For example, it may emit the light such that the shape of a barcode pattern, which is determined depending on the content of the data recorded in the recording layer 140, size, recorded date, data properties, or the like, emerges. Of course, it may emit the light such that the shape of a barcode pattern, which indicates some other data, emerges.

Moreover, as shown in FIG. 4(b), the emission layer 130 may emit the light such that the shape of a concentric barcode pattern emerges.

As shown in FIG. 5, the emission layer 130 may be formed throughout substantially the entire surface of an optical disc 102. In this case, the emission layer 130 may emit the light such that characters, drawing patterns, or the like emerge. For example, it may emit the light such that characters, drawing patterns, or the like emerge, which indicate the content of the data recorded in the recording layer 140, title, recorded date, or the like. Of course, it may emit the light such that appropriate characters, drawing patterns, or the like emerge.

Incidentally, it is obvious that the aspect of the emission in the emission layer 130 is not limited to the examples explained above. As long as the external equipment can receive the data from the light emitted from the emission layer 130, or as long as a user can sense some information, the aspect of the emission in the emission layer 130 (or the shape of the like of the emission layer 130) may be arbitrary. Of course, the same is true for the aspect of the light reception in the light-receiving layer 120 (or the shape or the like of the light-receiving layer 120).

FIRST MODIFIED EXAMPLE

Figure 6:
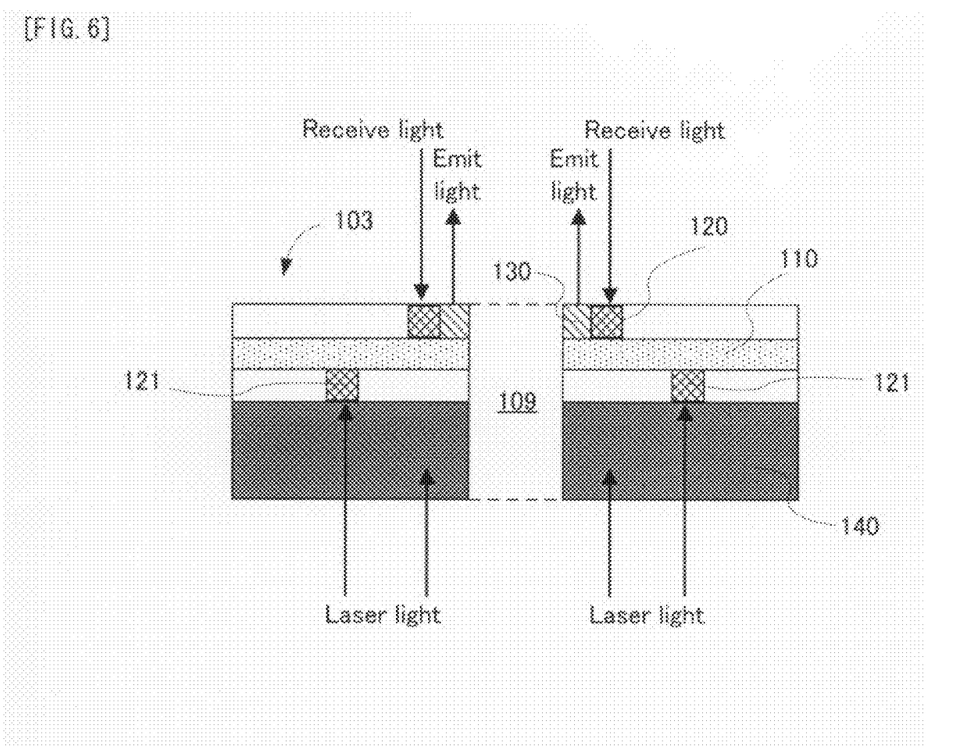
FIG. 6 is a cross sectional view showing the outline structure of an optical disc in a first modified example.

Next, with reference to FIG. 6, an optical disc 103 in a first modified example will be explained. FIG. 6 is a cross sectional view showing the outline structure of the optical disc 103 in the first modified example.

As shown in FIG. 6, on the optical disc 103 in the first modified example, a light-receiving layer 121 for receiving the laser light, which is irradiated to record the data into the recording layer 140, is formed in addition to the light-receiving layer 120, which performs the optical communication with the optical disc 100 and which receives the light that is irradiated from the external equipment. The light-receiving layer 121 is provided to detect which area the data is recorded in the recording layer 140. Specifically, as shown in FIG. 6, for example, it is assumed that the light-receiving layer 121 is disposed in an intermediate radial portion of the optical disc 103. At this time, if the data is recorded in an area in the recording layer 140, which is located in substantially the same radial position as that of the light receiving layer 121, the transmittance of the laser light is reduced, compared to the case that the data is not recorded in that area. That is, it is understood that the data is already recorded in the intermediate radial portion of the optical disc 103 if the intensity of the laser light which is received in the light-receiving layer 121 is relatively high.

As described above, by providing the light receiving layer 121 for receiving the laser light, which is irradiated to record the data into the recording layer 140, it is possible to detect the recording state of the data in the recording layer 140, relatively easily. Moreover, the operation of the semiconductor circuit included in the semiconductor layer 110 may be changed, as occasion demands, in accordance with the recording state of the data in the recording layer 140.

Incidentally, in this case, the recording layer 140 needs to have optical transparency.

SECOND MODIFIED EXAMPLE

Figure 7:
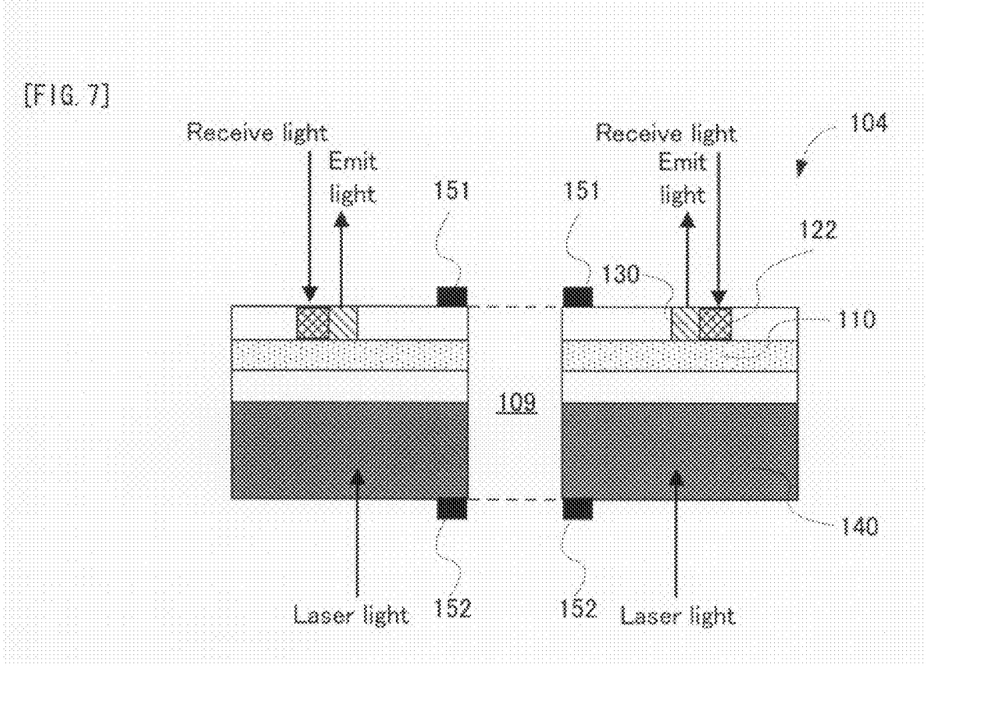
FIG. 7 is a cross sectional view showing the outline structure of an optical disc in a second modified example.

Next, with reference to FIG. 7, an optical disc 104 in a second modified example will be explained. FIG. 7 is a cross sectional view showing the outline structure of the optical disc 104 in the second modified example.

As shown in FIG. 7, the optical disc 104 in the second modified example is provided with feed terminals 151 and 152 including a ring-shaped metal electrode or the like. For example, the feed terminal 151 may fulfill a function of feeding a voltage of +V cc (V), and the feed terminal 152 may fulfill a function of a GND (ground). If the optical disc 104 is mounted on a spindle motor, a feeder line, which is disposed on a damper of the spindle motor, is in contact with each of the feed terminals 151 and 152. This causes each of the feed terminals 151 and 152, which electrically contacts each of the semiconductor layer 110, a light-receiving layer 122, and the emission layer 130, to feed an electric power necessary for each operation to each of the semiconductor layer 110, the light-receiving layer 122, and the emission layer 130.

By providing the feed terminals 151 and 152 including the metal electrode or the like, the light-receiving layer 122 does not have to feed the electric power. That is, the light-receiving layer 122 only needs to receive the light that is emitted from the external equipment which performs the optical communication.

THIRD MODIFIED EXAMPLE

Figure 8:
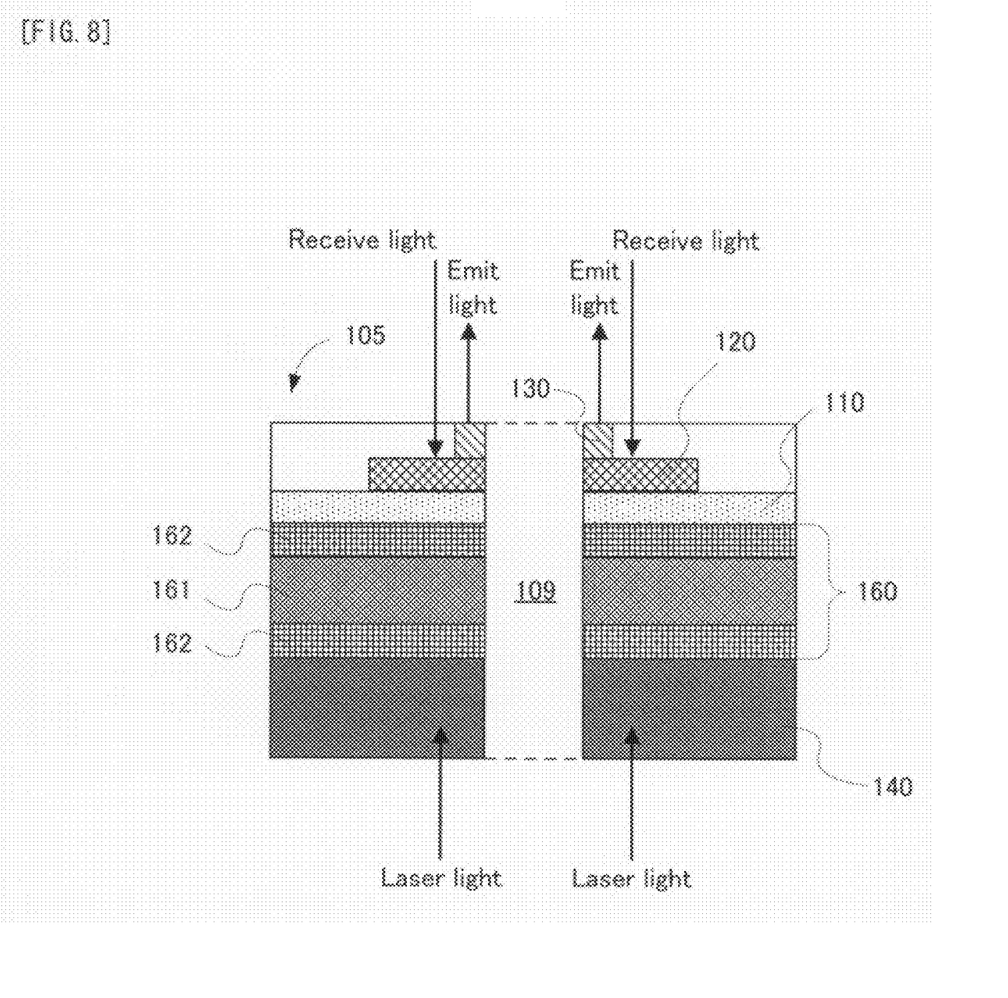
FIG. 8 is a cross sectional view showing the outline structure of an optical disc in a third modified example.

Next, with reference to FIG. 8, an optical disc 105 in a third modified example will be explained. FIG. 8 is a cross sectional view showing the outline structure of the optical disc 105 in the third modified example.

As shown in FIG. 8, the optical disc 105 in the third modified example is provided with an electrical condenser layer 160 between the recording layer 140 and each of the semiconductor layer 110, a light-receiving layer 120, and the emission layer 130.

The electrical condenser layer 160 is referred to as an electrical double layer capacitor in which an electrolyte 161 is contained between electrodes 162 including carbon nanotube. The electrical double layer capacitor has such characteristics that the electrolyte layer 161 is thin and that it can accumulate a large capacity of electric power. Moreover, since the carbon nanotube is used for the electrodes 162, the electrical condenser layer 160 can be extremely thin.

It is possible to accumulate the electric power obtained from the light-receiving layer 120 (e.g. the aforementioned organic solar battery or the like) in the electrical condenser layer 160, and to store predetermined data into the semiconductor layer 110 by using the accumulated electric power. For example, when the data is recorded onto the optical disc, the following operations are performed: management data or the like is stored in a memory or the like (e.g. a DRAM or the like) of recording equipment until the optical disc is ejected, the management data or the like is changed every time the recording aspect of the data on the optical disc is changed, and the file system, which reflects the management data, is stored onto the optical disc when the optical disc is ejected. If such operations are performed, it is possible to store the management data or the like, not in the memory of the recording equipment but in the semiconductor layer 110 on the optical disc 105 to which the electric power is fed by the electrical condenser layer 160.

The capacitor which constitutes the electrical condenser layer 160 has a large capacity, and the organic semiconductor which constitutes the semiconductor layer 110 saves the electric power. Thus, it is possible to store and hold the data in the semiconductor layer 110 (in particular, the semiconductor circuit thereof) for a long time. Moreover, it is possible to store and hold the data permanently, by disposing the optical disc 105 under an environment with illumination which can provide more electric power than the electric power which is consumed by the semiconductor layer 110, in a predetermined period.

Moreover, if this electric power is used for the emission in the emission layer 130, the data can be transmitted or received in a place which is protected from the radiation of the light on the optical disc 105 (in particular, the light-receiving layer 120). Moreover, by using this electric power, the light can be emitted by the emission layer 130 such that characters, drawing patterns, or the like emerge. This leads to enhancement of the value as the recording media of the optical disc 105.

(Information Recording/Reproducing Apparatus)

Figure 9:
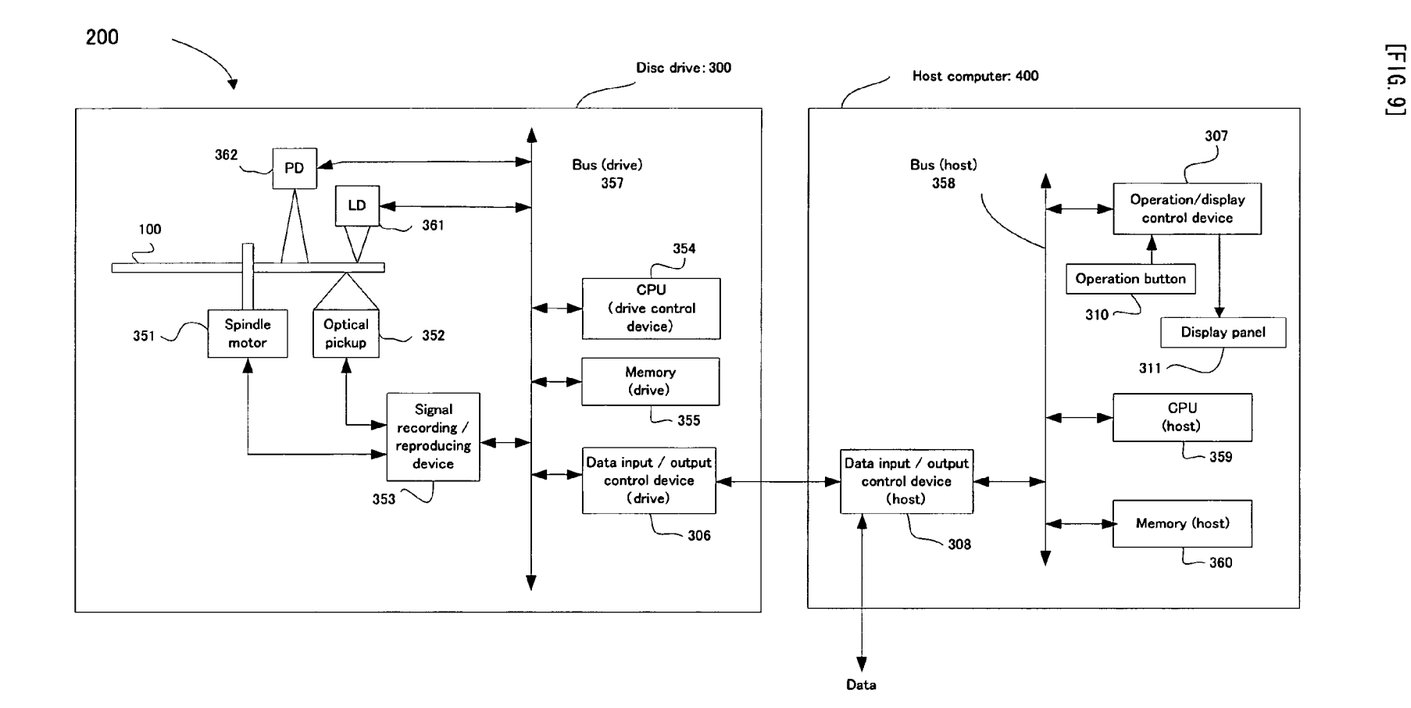
FIG. 9 is a block diagram conceptually showing the basic structure of a recording/reproducing apparatus in an embodiment.

Next, with reference to FIG. 9, an explanation will be given on a recording/reproducing apparatus as the recording apparatus or the reproducing apparatus of the present invention. FIG. 9 is a block diagram conceptually showing the basic structure of a recording/reproducing apparatus 200 in an embodiment. Incidentally, the recording/reproducing apparatus 200 has a function of recording the data into the recording layer 140 on the optical disc 100, a function of reproducing the data recorded in the recording layer 140 on the optical disc 100, and a function of performing the optical communication with the optical disc 100.

With reference to FIG. 9, the information recording/reproducing apparatus 200 is provided with: a disc drive 300; and a host computer 400. On the disc drive 300, the optical discs 100 to 105 (hereinafter referred to as the "optical disc 100 or the like") are actually loaded and the data is recorded or reproduced. On the host computer 400, such has a personal computer, the data recording and reproduction with respect to the disc drive 300 are controlled.

The disc drive 300 is provided with: the optical disc 100 or the like; a spindle motor 351; an optical pickup 352; a signal recording/reproducing device 353; a CPU (drive control device) 354; a memory 355; a data input/output control device 306; a LD (Laser Diode) 361; a PD (Photo Detector) 362; and a bus 357. Moreover, the host computer 400 is provided with: a CPU 359; a memory 360; an operation/display control device 307; an operation button 310; a display panel 311; and a data input/output control device 308.

The spindle motor 351 is intended to rotate and stop the optical disc 100 or the like, and operates upon accessing the optical disc 100 or the like. More specifically, the spindle motor 351 is adapted to rotate the optical disc 100 or the like at a predetermined speed, and stop it under spindle servo from a not-illustrated servo unit or the like.

The optical pickup 352 constitutes one specific example of the "recording device" or the "reproducing device" of the present invention and is provided with a semiconductor laser device, a lens, and the like, to record or reproduce the data with respect to the recording layer 140 on the optical disc 100 or the like. More specifically, the optical pickup 352 irradiates the recording layer 140 on the optical disc 100 or the like with a light beam, such as a laser beam, as reading light with a first power upon reproduction, and as writing light with a second power upon recording, with it modulated. This causes recording pits to be formed on e.g. a groove track GT.

The signal recording/reproducing device 353 controls the spindle motor 351 and the optical pickup 352, to thereby perform the recording/reproduction on the optical disc 100 or the like. More specifically, the signal recording/reproducing device 353 is provided with: a laser diode (LD) driver; a head amplifier; and the like, for example. The laser diode driver (LD driver) drives a not-illustrated semiconductor laser device located in the optical pickup 352. The head amplifier amplifies the output signal of the optical pickup 352, i.e. the reflective light of a light beam, and outputs the amplified signal.

The memory 355 is used in the general data processing and an OPC process or the like on the disc drive 300, including an area which is used as an intermediate buffer when the data is converted to the data that can be used on the signal recording/reproducing device 353, and the like. Moreover, the memory 355 is provided with: a ROM area into which a program for performing an operation as a recording device, i.e. firmware, is stored; a buffer for temporary storage of the record/reproduction data; a RAM area into which a parameter required for the operation of a firmware program or the like is stored; and the like.

The CPU (drive control device) 354 is connected to the signal recording/reproducing device 353 and the memory 355 through the bus 357, and controls the entire disc drive 300 by giving an instruction to various controlling devices. Normally, software or firmware for operating the CPU 354 is stored in the memory 355.

The data input/output control device 306 controls the input/output of the data from the exterior with respect to the disc drive 300, to thereby perform storage to and export from the data buffer on the memory 355. A drive control command, issued from the external host computer 400 connected to the disc drive 300 through an interface, such as a SCSI and an ATAPI, is transmitted to the CPU 354 through the data input/output control device 306. Moreover, the record/reproduction data is also exchanged with the host computer 400 through the data input/output control device 306, in the same manner.

The operation/display control device 307 receives an operation instruction and performs display with respect to the host computer 400, and transmits an instruction by the operation button 310, such as an instruction to record or reproduce, to the CPU 359. The CPU 359 may transmit a control command to the disc drive 300, through the data input/output control device 308, on the basis of instruction information from the operation/display control device 307, to thereby control the entire disc drive 300. In the same manner, the CPU 359 can transmit a command for requesting the disc drive 300 to transmit an operational state to the host, with respect to the disc drive 300. By this, the operational state of the disc drive 300, such as during recording and during reproduction, can be recognized, so that the CPU 359 can output the operational state of the disc drive 300 to the display panel 310, such as a fluorescent tube and an LCD, through the operation/display control device 307.

The memory 360 is an inner storage apparatus used by the host computer 400, and is provided with: a ROM area into which a firmware program, such as a BIOS (Basic Input/Output System), is stored; a RAM area into which a parameter required for the operation of an operating system and an application program or the like is stored; and the like. Moreover, the memory 360 may be connected to a not-illustrated external storage apparatus, such as a hard disk, through the data input/output control device 308.

The LD 361 constitutes one specific example of the "emitting device" of the present invention, and it emits the light onto the light-receiving layer 120 on the optical disc 100 or the like, under the control of the CPU 354 or 359. That is, it performs the optical communication (in particular, the transmission of the data from the recording/reproducing apparatus 200) with the optical disc 100 or the like.

The PD 362 constitutes one specific example of the "light receiving device" of the present invention, and it receives the light that is emitted from the emission layer 130 on the optical disc 100 or the like. That is, it performs the optical communication (in particular, the reception of the data transmitted from the optical disc 100 or the like) with the optical disc 100 or the like.

According to the recording/reproducing apparatus 200, it is possible to record the data into the recording layer 140, and it is also possible to preferably perform the optical communication with the light-receiving layer 120 and the emission layer 130, which operate under the control of the semiconductor circuit of the semiconductor layer 110. That is, it is possible to store the data into the semiconductor circuit of the semiconductor layer 110, or to read the data stored in the semiconductor circuit of the semiconductor layer 110. Alternatively, it is possible to give an instruction to perform a predetermined process to the semiconductor circuit of the semiconductor layer 110, or it is possible to perform the process on the recording/reproducing apparatus 200 side on the basis of the instruction from the semiconductor circuit of the semiconductor layer 110.

In particular, if the optical disc 102 shown in FIG. 5 is loaded, the recording/reproducing apparatus 200 may control the semiconductor circuit of the semiconductor layer 110 by irradiating the light from the PD 362 controlled by the CPU 354 to the light-receiving layer 120, to thereby cause the emission layer 130 emit the light such that characters, drawing patterns, or the like emerge. Alternatively, the recording/reproducing apparatus 200 may record the data which indicates the characters, the drawing patterns, or the like which are emerged by using the emission layer 130 into the semiconductor circuit of the semiconductor layer 110, by irradiating the light from the PD 362 controlled by the CPU 354 to the light-receiving layer 120. The characters, the drawing patterns, or the like which are indicated by the recorded data can be emerged, as occasion demands, by the emission of the emission layer 130 controlled by the semiconductor circuit of the semiconductor layer 110.

Moreover, for example, if the optical disc 103 shown in FIG. 6, the semiconductor circuit of the semiconductor layer 110 can recognize which area the data is recorded on the optical disc 103, in accordance with the transmittance of the laser light which is received in the light-receiving layer 121. Thus, the semiconductor circuit of the semiconductor layer 110 may transmit the data (e.g. recording management data or the like) which indicates which area the data is recorded on the optical disc 103 to the recording/reproducing apparatus 200, by making the emission layer 130 emit the light. In this case, the recording/reproducing apparatus 200 can recognize which area the data is recorded on the optical disc 103, as occasion demands. Thus, even if the recording management data or the like is not generated by the recording/reproducing apparatus 200 itself, or even if the recording management data is damaged for some reasons, it is possible to preferably recognize the recording aspect of the data on the optical disc 103.

Figure 10:
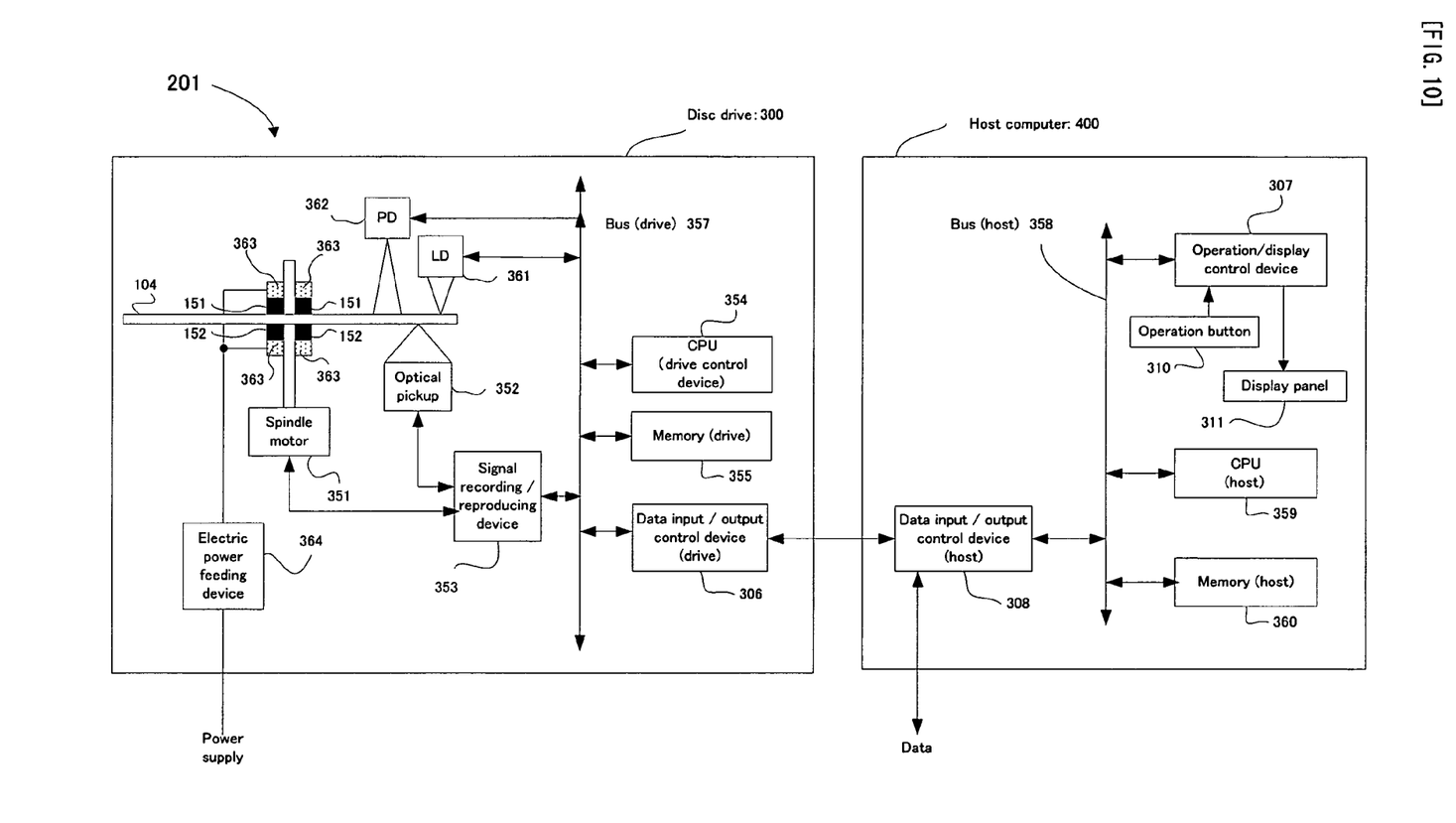
FIG. 10 is a block diagram conceptually showing the basic structure of the recording/reproducing apparatus in the embodiment.

Moreover, for example, with regard to the optical disc 104 shown in FIG. 7, the data recording or reproduction, or the data communication through the LD 361 and the PD 362 is preferably performed by a recording/reproducing apparatus 201, which is provided with a feed terminal 363 in a clamp portion of the spindle motor 351, wherein the feed terminal 363 electrically contacts each of the feed terminals 151 and 152 of the optical disc 104, as shown in FIG. 10, instead of the recording/reproducing apparatus 200 shown in FIG. 9. By this, it is possible to feed the electric power necessary for each operation, to each of the semiconductor layer 110, the light-receiving layer 122, and the emission layer 130.

Moreover, with regard to the optical disc 105 shown in FIG. 8, the data recording or reproduction, or the data communication through the LD 361 and the PD 362 may be performed by using the recording/reproducing apparatus 200 shown in FIG. 9. Even by this, it is possible to feed the electric power necessary for each operation, to each of the semiconductor layer 110, the light-receiving layer 122, and the emission layer 130. Alternatively, the data recording or reproduction, or the data communication through the LD 361 and the PD 362 may be performed by using the recording/reproducing apparatus 201 shown in FIG. 10. By this, it is possible to accumulate (i.e. charge) the electric power in the electrical condenser layer 160 by the feeding from an electric power feeding device 364. In this case, the electrical condenser layer 160 is preferably provided with a feed terminal which electrically contacts the electric power feeding device 364.

Moreover, in the aforementioned embodiments, the optical disc 100 or the like is explained as one example of the recording medium, and the recorder or player related to the optical disc 100 or the like is explained as one example of the recording apparatus or the reproducing apparatus. The present invention, however, is not limited to the optical disc and the recorder or the player thereof, and can be applied to other various recording media, and the recorders or players thereof, which support high density recording or high transfer rate.

The present invention is not limited to the aforementioned embodiments, and various changes may be made, if desired, without departing from the essence or spirit of the invention which can be read from the claims and the entire specification. A recording medium, a recording apparatus and method, and a reproducing apparatus and method, which involve such changes, are also intended to be within the technical scope of the present invention.

INDUSTRIAL APPLICABILITY

The recording medium, the recording apparatus and method, and the reproducing apparatus and method according to the present invention can be applied to a recording medium, such as a DVD, and moreover, a recording apparatus, such as a DVD recorder, and a reproducing apparatus, such as a DVD player, or the like.

The invention claimed is:

1. A recording medium comprising:
an element layer comprising a semiconductor element and an emission element, which emits light on the basis of an instruction from the semiconductor element; and
a recording layer in which readable predetermined data is recorded by irradiating a light beam,
the emission element performing at least one of signal transmission and reception, under control the semiconductor element.

2. The recording medium according to claim 1, wherein the semiconductor element is formed by at least one of a deposition method and a coating method.

3. The recording medium according to claim 1, wherein the semiconductor element includes an organic semiconductor.

4. The recording medium according to claim 1, wherein the semiconductor element stores therein data which is related to the data recorded in said recording layer.

5. The recording medium according to claim 1, wherein said recording medium has a circular disk shape, and the emission element is formed in a ring shape.

6. The recording medium according to claim 1, wherein the emission element is formed throughout an entire surface of said recording medium.

7. The recording medium according to claim 1, wherein an emission pattern of the emission element is a barcode pattern.

8. The recording medium according to claim 1, wherein the emission element includes an organic EL (Electro Luminescence) element.

9. The recording medium according to claim 1, wherein the emission element includes an inorganic EL element.

10. The recording medium according to claim 1, wherein the emission element is formed in a position closer to an exterior of said recording medium, compared to the semiconductor element.

11. The recording medium according to claim 1, wherein said element layer further comprises a light receiving element for receiving light which enters from an exterior of said recording medium.

12. The recording medium according to claim 11, wherein said recording medium has a circular disk shape, and
the light receiving element is formed in a ring shape.

13. The recording medium according to claim 11, wherein the light receiving element includes an organic light receiving element.

14. The recording medium according to claim 11, wherein the light receiving element is formed in a position closer to an exterior of said recording medium, compared to the semiconductor element.

15. The recording medium according to claim 1, wherein said element layer further comprises a feed element for feeding an electric power to at least one of the semiconductor element and the emission element.

16. The recording medium according to claim 15, wherein the feed element includes an organic solar battery.

17. The recording medium according to claim 16, wherein the organic solar battery is formed in a position closer to an exterior of said recording medium, compared to the semiconductor element.

18. The recording medium according to claim 11, further comprising an electrical double capacitor layer in which an electric power which is photoelectrically converted by the light receiving element.

19. A recording apparatus for recording data onto a recording medium comprising: an element layer comprising a semiconductor element and an emission element, which emits light on the basis of an instruction from the semiconductor element; and a recording layer in which the readable predetermined data is recorded by irradiating a light beam, the emission element performing at least one of signal transmission and reception, under control the semiconductor element, said recording apparatus comprising:
a recording device for recording the data into said recording layer by irradiating the light beam; and
a light receiving device for receiving the light emitted by the emission element.

20. The recording apparatus according to claim 19, wherein
said element layer further comprises a light receiving element for receiving light which enters from an exterior of said recording medium, and
said recording apparatus further comprises an emitting device for emitting light to the light receiving element.

21. A recording method of recording data onto a recording medium comprising: an element layer comprising a semiconductor element and an emission element, which emits light on the basis of an instruction from the semiconductor element; and a recording layer in which the readable predetermined data is recorded by irradiating a light beam, the emission element performing at least one of signal transmission and reception, under control the semiconductor element, said recording method comprising:

a recording process of recording the data into said recording layer by irradiating the light beam; and a light receiving process of receiving the light emitted by the emission element.

22. A reproducing apparatus for reproducing data recorded on a recording medium comprising: an element layer comprising a semiconductor element and an emission element, which emits light on the basis of an instruction from the semiconductor element; and a recording layer in which the readable predetermined data is recorded by irradiating a light beam, the emission element performing at least one of signal transmission and reception, under control the semiconductor element, said reproducing apparatus comprising:

a reproducing device for reproducing the data recorded in said recording layer by irradiating the light beam; and a light receiving device for receiving the light emitted by the emission element.

23. The reproducing apparatus according to claim 22, wherein said element layer further comprises a light receiving element for receiving light which enters from an exterior of said recording medium, and said reproducing apparatus further comprises an emitting device for emitting light to the light receiving element.

24. A reproducing method of reproducing data recorded on a recording medium comprising: an element layer comprising a semiconductor element and an emission element, which emits light on the basis of an instruction from the semiconductor element; and a recording layer in which the readable predetermined data is recorded by irradiating a light beam, the emission element performing at least one of signal transmission and reception, under control the semiconductor element, said reproducing method comprising:

a reproducing process of reproducing the data recorded in said recording layer by irradiating the light beam; and a light receiving process of receiving the light emitted by the emission element.

* * * * *